United States Patent
Zhu et al.

(10) Patent No.: US 9,874,871 B1
(45) Date of Patent: Jan. 23, 2018

(54) METHOD TO DYNAMICALLY ADJUSTING STEERING RATES OF AUTONOMOUS VEHICLES

(71) Applicant: Baidu USA LLC, Sunnyvale, CA (US)

(72) Inventors: Fan Zhu, Sunnyvale, CA (US); Qi Kong, Sunnyvale, CA (US); Guang Yang, Sunnyvale, CA (US); Jingao Wang, Sunnyvale, CA (US)

(73) Assignee: BAIDU USA LLC, Sunnyvale, CA (US)

( * ) Notice: Subject to any disclaimer, the term of this patent is extended or adjusted under 35 U.S.C. 154(b) by 0 days.

(21) Appl. No.: 15/358,078

(22) Filed: Nov. 21, 2016

(51) Int. Cl.
| | |
|---|---|
| *G01C 22/00* | (2006.01) |
| *G05D 1/00* | (2006.01) |
| *G05D 1/02* | (2006.01) |
| *B60W 30/09* | (2012.01) |

(52) U.S. Cl.
CPC ......... *G05D 1/0005* (2013.01); *G05D 1/0088* (2013.01); *G05D 1/027* (2013.01); *B60W 30/09* (2013.01)

(58) Field of Classification Search
USPC ............................ 701/23–24, 26, 41; 180/6.2
See application file for complete search history.

(56) References Cited

U.S. PATENT DOCUMENTS

| | | | |
|---|---|---|---|
| 8,386,110 B2 * | 2/2013 | Maekawa | G05D 1/0217 180/168 |
| 8,437,890 B2 * | 5/2013 | Anderson | B60W 30/09 701/23 |
| 8,965,691 B1 | 2/2015 | Lombrozo | |
| 2010/0076640 A1 * | 3/2010 | Maekawa | G05D 1/0217 701/26 |
| 2010/0228427 A1 | 9/2010 | Anderson et al. | |
| 2014/0032017 A1 * | 1/2014 | Anderson | B60W 30/09 701/3 |
| 2015/0100179 A1 | 4/2015 | Alaniz et al. | |
| 2016/0139594 A1 | 5/2016 | Okumura et al. | |

OTHER PUBLICATIONS

Traffic flow control in vehicular communication networks; Teng Liu; Alhussein A. Abouzeid; A. Agung Julius; 2017 American Control Conference (ACC); Year: 2017; pp. 5513-5518.*

(Continued)

*Primary Examiner* — Cuong H Nguyen
(74) *Attorney, Agent, or Firm* — Blakely, Sokoloff, Taylor & Zafman LLP

(57) ABSTRACT

In one embodiment, a number of steering rate candidates are determined for a steering control command of operating an autonomous vehicle. For each of the steering rate candidates, a number of individual costs are calculated for the steering rate candidate by applying a plurality of cost functions, each cost function corresponding to one of a plurality of cost categories. A total cost for the steering rate candidate is determined based on the individual costs produced by the cost functions. One of the steering rate candidates having a lowest total cost is selected as a target steering rate. A steering control command is generated based on the selected steering rate candidate to control a steering wheel of the autonomous vehicle.

24 Claims, 8 Drawing Sheets

(56) References Cited

OTHER PUBLICATIONS

An analysis on plug-in electric vehicle's operating cost considering cost of battery capacity degradation; Hao Li; Su Su; Luobin He; Wenzhong Gao; 2017 IEEE International Conference on Industrial Technology (ICIT) ; Year: 2017; pp. 1388-1392.*

A method for driving control authority transition for cooperative autonomous vehicle; Yongbon Koo; Jinwoo Kim; Wooyong Han 2015 IEEE Intelligent Vehicles Symposium (IV); Year: 2015; pp. 394-399.*

Optimal Control of State-Dependent Service Rates in a MAP/M/1 Queue; Li Xia; Qi-Ming He; Attahiru Sule Alfa; IEEE Transactions on Automatic Control; Year: 2017, vol. PP, Issue: 99; pp. 1-1.*

Trajectory planning for car-like robots in unknown, unstructured environments; Dennis Fassbender; André Mueller; Hans-Joachim Wuensche; 2014 IEEE/RSJ International Conference on Intelligent Robots and Systems; Year: 2014; pp. 3630-3635.*

Combined Speed and Steering Control in High Speed Autonomous Ground Vehicles for Obstacle Avoidance Using Model Predictive Control; Jiechao Liu; Paramsothy Jayakumar; Jeff Stein; Tulga Ersal; IEEE Transactions on Vehicular Technology Year: 2017, vol. PP, Issue: 99; pp. 1-1.*

Development of a Genetic-Algorithm-Based Nonlinear Model Predictive Control Scheme on Velocity and Steering of Autonomous Vehicles ; Xinxin Du; Kyaw Ko Ko Htet; Kok Kiong Tan; IEEE Transactions on Industrial Electronics; Year: 2016, vol. 63, Issue: 11; pp. 6970-6977.*

* cited by examiner

| Steering Speed/Rate Candidates (degrees/second) 501 | 100 | 200 | 300 | 400 | 500 |
|---|---|---|---|---|---|
| Cost based on difference between next target and current steering position (assuming difference = 300) 502 | 200 | 100 | 0 | 0 | 0 |
| Cost based on difference between past target steering position and past steering position (assuming difference = 100) 503 | 80 | 60 | 40 | 20 | 0 |
| Cost based on vehicle speed (assuming current vehicle speed = 30 mph) 504 | 30 | 60 | 90 | 120 | 150 |
| Cost based on steering rate candidate itself 505 | 100 | 200 | 300 | 400 | 500 |
| Total Cost 506 | 410 | 420 | 430 | 540 | 650 |

FIG. 5

METHOD TO DYNAMICALLY ADJUSTING STEERING RATES OF AUTONOMOUS VEHICLES

TECHNICAL FIELD

Embodiments of the present invention relate generally to operating autonomous vehicles. More particularly, embodiments of the invention relate to dynamically adjusting steering rates of autonomous vehicles.

BACKGROUND

Vehicles operating in an autonomous mode (e.g., driverless) can relieve occupants, especially the driver, from some driving-related responsibilities. When operating in an autonomous mode, the vehicle can navigate to various locations using onboard sensors, allowing the vehicle to travel with minimal human interaction or in some cases without any passengers.

Motion planning and control are critical operations in autonomous driving. However, conventional motion planning operations estimate the difficulty of completing a given path mainly from its curvature and speed, without considering the differences in features for different types of vehicles. Same motion planning and control is applied to all types of vehicles, which may not be accurate and smooth under some circumstances.

In addition, steer control is a critical step in autonomous driving. When seeking a steer control accuracy, one usually requires a high steering rate (also referred to as a steering moving speed). However, a high steering rate may be dangerous to both the vehicle steering system and passengers, as well as overshoot during the operation.

BRIEF DESCRIPTION OF THE DRAWINGS

Embodiments of the invention are illustrated by way of example and not limitation in the figures of the accompanying drawings in which like references indicate similar elements.

FIG. 5 is a data structure illustrating a process of determining steering rates according to one embodiment of the invention.

DETAILED DESCRIPTION

Figure 1:
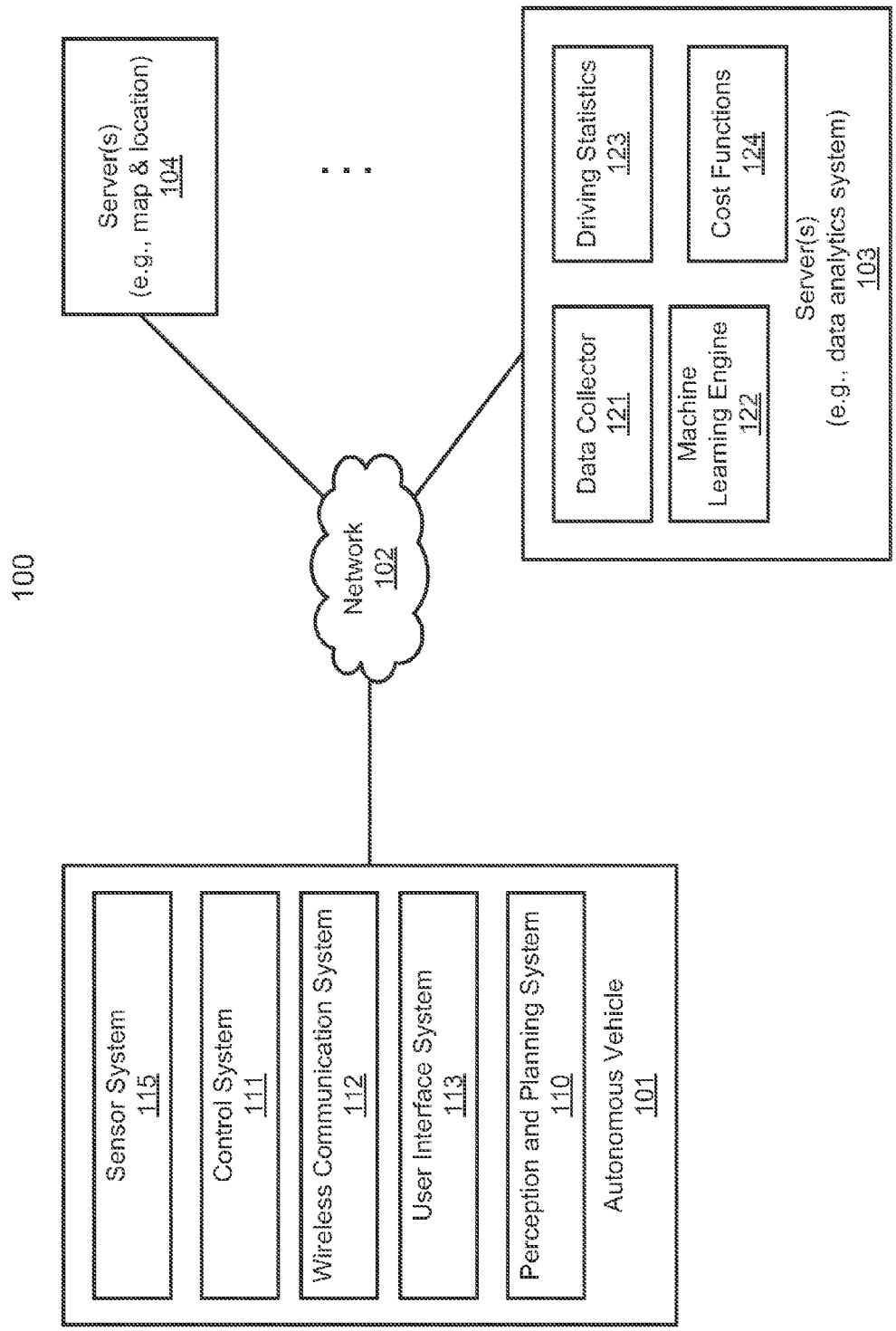
FIG. 1 is a block diagram illustrating a networked system according to one embodiment of the invention.

Various embodiments and aspects of the inventions will be described with reference to details discussed below, and the accompanying drawings will illustrate the various embodiments. The following description and drawings are illustrative of the invention and are not to be construed as limiting the invention. Numerous specific details are described to provide a thorough understanding of various embodiments of the present invention. However, in certain instances, well-known or conventional details are not described in order to provide a concise discussion of embodiments of the present inventions.

Reference in the specification to "one embodiment" or "an embodiment" means that a particular feature, structure, or characteristic described in conjunction with the embodiment can be included in at least one embodiment of the invention. The appearances of the phrase "in one embodiment" in various places in the specification do not necessarily all refer to the same embodiment.

According to some embodiments, a steering rate determination system or predictive model is provided to determine or recommend a steering rate based on the vehicle control information as planned at the point in time. The steering rate determination system or predictive model may be created based on a large set of driving statistics captured from a variety of vehicles driven under a variety of driving conditions, which may be trained using a machine learning system. The vehicle control information may include a current target steering position, a current steering position, a previous target steering position, a previous steering position, and/or a current vehicle speed at the point in time. The vehicle control information may be captured additionally by a variety of a variety of sensors of the vehicle at real-time while the vehicle is in motion. The output of the system or predictive model represents a recommended steering rate (also referred to as a target steering rate), which may be utilized to generate a steering control command for a subsequent command cycle or cycles. A steering rate refers to a turning speed of a steering wheel of a vehicle, for example, in a form of degrees per second.

In one embodiment, a set of steering rate candidates is determined, which represent the possible steering rates for a particular autonomous vehicle or particular type of autonomous vehicles. The set of steering rate candidates may be predetermined and they may vary from vehicles to vehicles. For each of the steering rate candidates, one or more individual costs are calculated for the steering rate candidate using one or more cost functions. Each cost function corresponds to one of the cost categories to be taken into consideration when determining a target steering rate for one or more subsequent command cycles. A total cost is calculated based on the individual costs for each steering rate candidate. After all of the total costs of all steering rate candidates have been determined, one of the steering rate candidates having the lowest total cost is selected as the target steering rate for the subsequent command cycle or cycles.

FIG. 1 is a block diagram illustrating an autonomous vehicle network configuration according to one embodiment of the invention. Referring to FIG. 1, network configuration 100 includes autonomous vehicle 101 that may be communicatively coupled to one or more servers 103-104 over a network 102. Although there is one autonomous vehicle shown, multiple autonomous vehicles can be coupled to each other and/or coupled to servers 103-104 over network 102. Network 102 may be any type of networks such as a local area network (LAN), a wide area network (WAN) such as the Internet, a cellular network, a satellite network, or a combination thereof, wired or wireless. Server(s) 103-104 may be any kind of servers or a cluster of servers, such as Web or cloud servers, application servers, backend servers, or a combination thereof. Servers 103-104 may be data analytics servers, content servers, traffic information servers, map and point of interest (MPOI) severs, or location servers, etc.

An autonomous vehicle refers to a vehicle that can be configured to in an autonomous mode in which the vehicle navigates through an environment with little or no input from a driver. Such an autonomous vehicle can include a sensor system having one or more sensors that are configured to detect information about the environment in which the vehicle operates. The vehicle and its associated controller(s) use the detected information to navigate through the environment. Autonomous vehicle 101 can operate in a manual mode, a full autonomous mode, or a partial autonomous mode.

In one embodiment, autonomous vehicle 101 includes, but is not limited to, perception and planning system 110, vehicle control system 111, wireless communication system 112, user interface system 113, infotainment system 114, and sensor system 115. Autonomous vehicle 101 may further include certain common components included in ordinary vehicles, such as, an engine, wheels, steering wheel, transmission, etc., which may be controlled by vehicle control system 111 and/or perception and planning system 110 using a variety of communication signals and/or commands, such as, for example, acceleration signals or commands, deceleration signals or commands, steering signals or commands, braking signals or commands, etc.

Components 110-115 may be communicatively coupled to each other via an interconnect, a bus, a network, or a combination thereof. For example, components 110-115 may be communicatively coupled to each other via a controller area network (CAN) bus. A CAN bus is a vehicle bus standard designed to allow microcontrollers and devices to communicate with each other in applications without a host computer. It is a message-based protocol, designed originally for multiplex electrical wiring within automobiles, but is also used in many other contexts.

Figure 2:
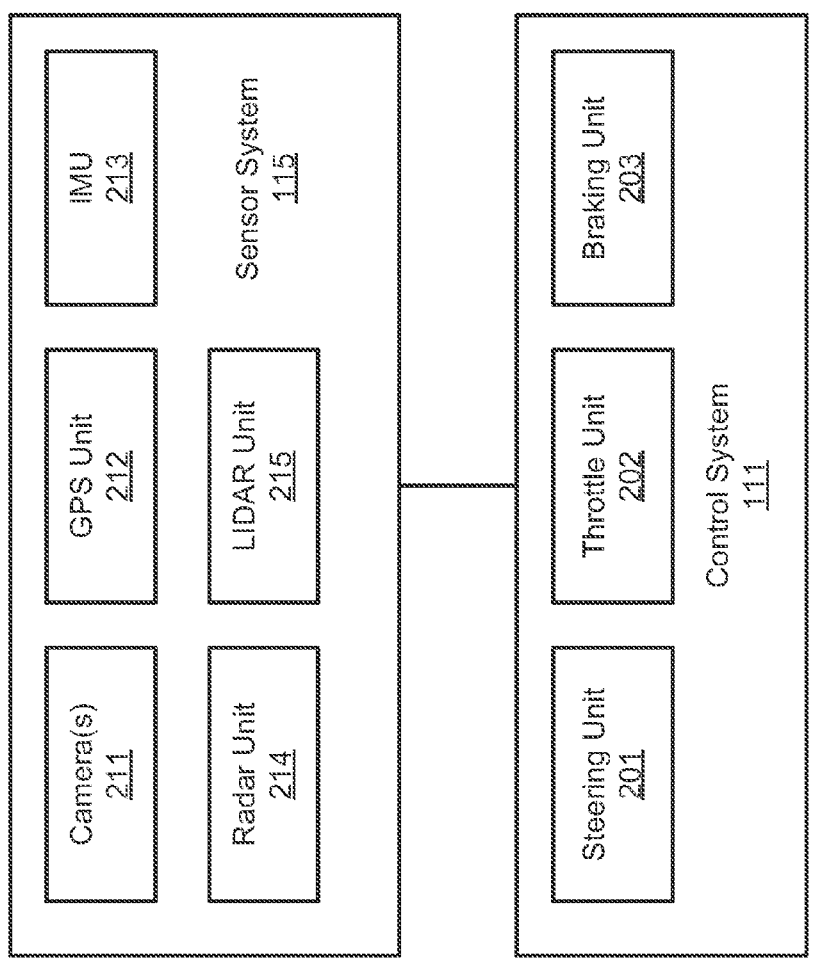
FIG. 2 is a block diagram illustrating an example of an autonomous vehicle according to one embodiment of the invention.

Referring now to FIG. 2, in one embodiment, sensor system 115 includes, but it is not limited to, one or more cameras 211, global positioning system (GPS) unit 212, inertial measurement unit (IMU) 213, radar unit 214, and a light detection and range (LIDAR) unit 215. GPS system 212 may include a transceiver operable to provide information regarding the position of the autonomous vehicle. IMU unit 213 may sense position and orientation changes of the autonomous vehicle based on inertial acceleration. Radar unit 214 may represent a system that utilizes radio signals to sense objects within the local environment of the autonomous vehicle. In some embodiments, in addition to sensing objects, radar unit 214 may additionally sense the speed and/or heading of the objects. LIDAR unit 215 may sense objects in the environment in which the autonomous vehicle is located using lasers. LIDAR unit 215 could include one or more laser sources, a laser scanner, and one or more detectors, among other system components. Cameras 211 may include one or more devices to capture images of the environment surrounding the autonomous vehicle. Cameras 211 may be still cameras and/or video cameras. A camera may be mechanically movable, for example, by mounting the camera on a rotating and/or tilting a platform.

Sensor system 115 may further include other sensors, such as, a sonar sensor, an infrared sensor, a steering sensor, a throttle sensor, a braking sensor, and an audio sensor (e.g., microphone). An audio sensor may be configured to capture sound from the environment surrounding the autonomous vehicle. A steering sensor may be configured to sense the steering angle of a steering wheel, wheels of the vehicle, or a combination thereof. A throttle sensor and a braking sensor sense the throttle position and braking position of the vehicle, respectively. In some situations, a throttle sensor and a braking sensor may be integrated as an integrated throttle/braking sensor.

In one embodiment, vehicle control system 111 includes, but is not limited to, steering unit 201, throttle unit 202 (also referred to as an acceleration unit), and braking unit 203. Steering unit 201 is to adjust the direction or heading of the vehicle. Throttle unit 202 is to control the speed of the motor or engine that in turn control the speed and acceleration of the vehicle. Braking unit 203 is to decelerate the vehicle by providing friction to slow the wheels or tires of the vehicle. Note that the components as shown in FIG. 2 may be implemented in hardware, software, or a combination thereof.

Referring back to FIG. 1, wireless communication system 112 is to allow communication between autonomous vehicle 101 and external systems, such as devices, sensors, other vehicles, etc. For example, wireless communication system 112 can wirelessly communicate with one or more devices directly or via a communication network, such as servers 103-104 over network 102. Wireless communication system 112 can use any cellular communication network or a wireless local area network (WLAN), e.g., using WiFi to communicate with another component or system. Wireless communication system 112 could communicate directly with a device (e.g., a mobile device of a passenger, a display device, a speaker within vehicle 101), for example, using an infrared link, Bluetooth, etc. User interface system 113 may be part of peripheral devices implemented within vehicle 101 including, for example, a keyword, a touch screen display device, a microphone, and a speaker, etc.

Some or all of the functions of autonomous vehicle 101 may be controlled or managed by perception and planning system 110, especially when operating in an autonomous driving mode. Perception and planning system 110 includes the necessary hardware (e.g., processor(s), memory, storage) and software (e.g., operating system, planning and routing programs) to receive information from sensor system 115, control system 111, wireless communication system 112, and/or user interface system 113, process the received information, plan a route or path from a starting point to a destination point, and then drive vehicle 101 based on the planning and control information. Alternatively, perception and planning system 110 may be integrated with vehicle control system 111.

For example, a user as a passenger may specify a starting location and a destination of a trip, for example, via a user interface. Perception and planning system 110 obtains the trip related data. For example, perception and planning system 110 may obtain location and route information from an MPOI server, which may be a part of servers 103-104. The location server provides location services and the MPOI server provides map services and the POIs of certain locations. Alternatively, such location and MPOI information may be cached locally in a persistent storage device of perception and planning system 110.

While autonomous vehicle 101 is moving along the route, perception and planning system 110 may also obtain real-time traffic information from a traffic information system or server (TIS). Note that servers 103-104 may be operated by a third party entity. Alternatively, the functionalities of servers 103-104 may be integrated with perception and planning system 110. Based on the real-time traffic information, MPOI information, and location information, as well as real-time local environment data detected or sensed by sensor system 115 (e.g., obstacles, objects, nearby vehicles), perception and planning system 110 can plan an optimal route and drive vehicle 101, for example, via control system 111, according to the planned route to reach the specified destination safely and efficiently.

Server 103 may be a data analytics system to perform data analytics services for a variety of clients. In one embodiment, data analytics system 103 includes data collector 121 and machine learning engine 122. Data collector 121 collects driving statistics 123 from a variety of vehicles, either autonomous vehicles or regular vehicles driven by human drivers. Driving statistics 123 include information indicating the driving commands (e.g., throttle, brake, steering commands) issued and responses of the vehicles (e.g., speeds, accelerations, decelerations, directions) captured by sensors of the vehicles at different points in time. Driving statistics 123 may further include information describing the driving environments at different points in time, such as, for example, routes (including starting and destination locations), MPOIs, road conditions, weather conditions, etc.

Based on driving statistics 123, machine learning engine 122 performs or trains a set of algorithms or predictive models 124 for a variety of purposes. In one embodiment, machine learning engine 122 generates a set of one or more cost functions or cost predictive models 124 to determine or predict a cost for a particular steering rate to be targeted. Cost functions 124 may include one or more individual cost functions to calculate one or more individual costs of one or more cost category. Cost functions 124 are designed to calculate individual costs for targeting a specific steering rate. In one embodiment, cost functions 124 include a first cost function to determine a first cost based on a target steering position and a current steering position. Cost functions 124 may further include a second cost function to determine a second cost based on a past target steering position and a past steering position in a previous command cycle. Cost functions 124 may further include a third cost function to determine a third cost based on the current vehicle speed. Cost functions 124 may further include a fourth cost function to determine a fourth cost based on a target steering rate.

In one embodiment, cost functions 124 may be determined and created by machine learning engine 122 based on driving statistics 123, which were collected from a variety of vehicles. Machine learning engine 122 may examine the driving statistics of autonomous driving and compare those with the driving statistics of the vehicles driven by human drivers under the same or similar driving circumstances. The difference between the autonomous driving and the human driving may determine the cost for the driving parameters, in this example, steering rates, in order to achieve the same or similar results as of human drivers. In one embodiment, if the difference between autonomous driving and human driving is small, the cost may be lower, or vice versa. Once the cost functions 124 have been created, they can be uploaded to autonomous vehicles to be used to dynamically adjust the steering rates as planned at real-time, such that the turning of the vehicles can be more comfortable and smooth.

Figure 3:
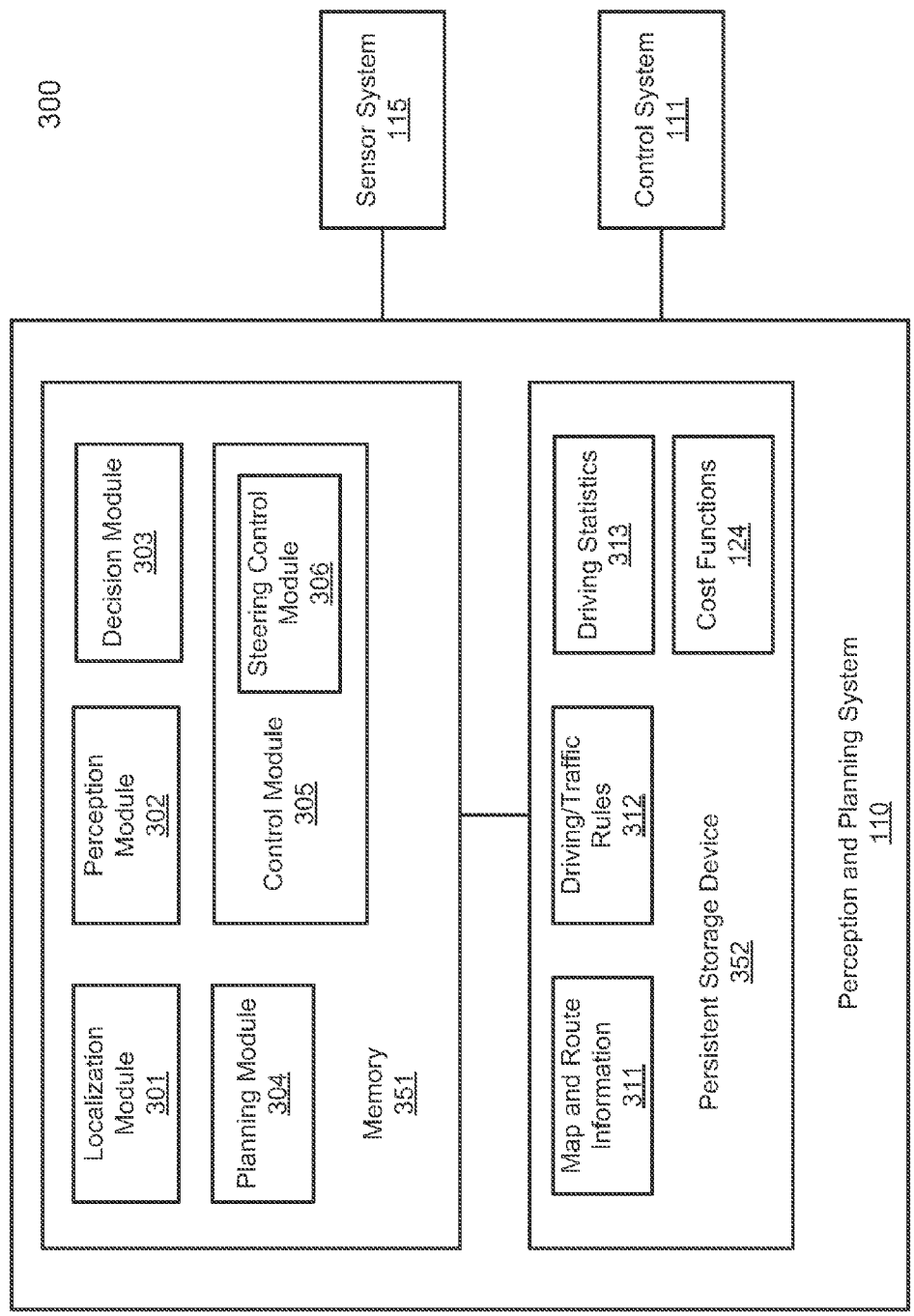
FIG. 3 is a block diagram illustrating an example of a perception and planning system used with an autonomous vehicle according to one embodiment of the invention.

FIG. 3 is a block diagram illustrating an example of a perception and planning system used with an autonomous vehicle according to one embodiment of the invention. System 300 may be implemented as a part of autonomous vehicle 101 of FIG. 1 including, but is not limited to, perception and planning system 110, control system 111, and sensor system 115. Referring to FIG. 3, perception and planning system 110 includes, but is not limited to, localization module 301, perception module 302, decision module 303, planning module 304, and control module 305.

Some or all of modules 301-307 may be implemented in software, hardware, or a combination thereof. For example, these modules may be installed in persistent storage device 352, loaded into memory 351, and executed by one or more processors (not shown). Note that some or all of these modules may be communicatively coupled to or integrated with some or all modules of vehicle control system 111 of FIG. 2. Some of modules 301-307 may be integrated together as an integrated module.

Localization module 301 (also referred to as a map and route module) manages any data related to a trip or route of a user. A user may log in and specify a starting location and a destination of a trip, for example, via a user interface. Localization module 301 communicates with other components of autonomous vehicle 300, such as map and route information 311, to obtain the trip related data. For example, localization module 301 may obtain location and route information from a location server and a map and POI (MPOI) server. A location server provides location services and an MPOI server provides map services and the POIs of certain locations, which may be cached as part of map and route information 311. While autonomous vehicle 300 is moving along the route, localization module 301 may also obtain real-time traffic information from a traffic information system or server.

Based on the sensor data provided by sensor system 115 and localization information obtained by localization module 301, a perception of the surrounding environment is determined by perception module 302. The perception information may represent what an ordinary driver would perceive surrounding a vehicle in which the driver is driving. The perception can include the lane configuration (e.g., straight or curve lanes), traffic light signals, a relative position of another vehicle, a pedestrian, a building, crosswalk, or other traffic related signs (e.g., stop signs, yield signs), etc., for example, in a form of an object.

Perception module 302 may include a computer vision system or functionalities of a computer vision system to process and analyze images captured by one or more cameras in order to identify objects and/or features in the environment of autonomous vehicle. The objects can include traffic signals, road way boundaries, other vehicles, pedestrians, and/or obstacles, etc. The computer vision system may use an object recognition algorithm, video tracking, and other computer vision techniques. In some embodiments, the computer vision system can map an environment, track objects, and estimate the speed of objects, etc. Perception module 302 can also detect objects based on other sensors data provided by other sensors such as a radar and/or LIDAR.

For each of the objects, decision module 303 makes a decision regarding how to handle the object. For example, for a particular object (e.g., another vehicle in a crossing route) as well as its metadata describing the object (e.g., a speed, direction, turning angle), decision module 303 decides how to encounter the object (e.g., overtake, yield, stop, pass). Decision module 303 may make such decisions according to a set of rules such as driving or traffic rules 312, which may be stored in persistent storage device 352.

Based on a decision for each of the objects perceived, planning module 304 plans a path or route for the autonomous vehicle, as well as driving parameters (e.g., distance, speed, and/or turning angle). That is, for a given object, decision module 303 decides what to do with the object, while planning module 304 determines how to do it. For example, for a given object, decision module 303 may decide to pass the object, while planning module 304 may determine whether to pass on the left side or right side of the object. Planning and control data is generated by planning module 304 including information describing how vehicle 300 would move in a next moving cycle (e.g., next route/path segment). For example, the planning and control data may instruct vehicle 300 to move 10 meters at a speed of 30 mile per hour (mph), then change to a right lane at the speed of 25 mph.

Based on the planning and control data, control module 305 controls and drives the autonomous vehicle, by sending proper commands or signals to vehicle control system 111, according to a route or path defined by the planning and control data. The planning and control data include sufficient information to drive the vehicle from a first point to a second point of a route or path using appropriate vehicle settings or driving parameters (e.g., throttle, braking, and turning commands) at different points in time along the path or route.

Note that decision module 303 and planning module 304 may be integrated as an integrated module. Decision module 303/planning module 304 may include a navigation system or functionalities of a navigation system to determine a driving path for the autonomous vehicle. For example, the navigation system may determine a series of speeds and directional headings to effect movement of the autonomous vehicle along a path that substantially avoids perceived obstacles while generally advancing the autonomous vehicle along a roadway-based path leading to an ultimate destination. The destination may be set according to user inputs via user interface system 113. The navigation system may update the driving path dynamically while the autonomous vehicle is in operation. The navigation system can incorporate data from a GPS system and one or more maps so as to determine the driving path for the autonomous vehicle.

Decision module 303/planning module 304 may further include a collision avoidance system or functionalities of a collision avoidance system to identify, evaluate, and avoid or otherwise negotiate potential obstacles in the environment of the autonomous vehicle. For example, the collision avoidance system may effect changes in the navigation of the autonomous vehicle by operating one or more subsystems in control system 111 to undertake swerving maneuvers, turning maneuvers, braking maneuvers, etc. The collision avoidance system may automatically determine feasible obstacle avoidance maneuvers on the basis of surrounding traffic patterns, road conditions, etc. The collision avoidance system may be configured such that a swerving maneuver is not undertaken when other sensor systems detect vehicles, construction barriers, etc. in the region adjacent the autonomous vehicle that would be swerved into. The collision avoidance system may automatically select the maneuver that is both available and maximizes safety of occupants of the autonomous vehicle. The collision avoidance system may select an avoidance maneuver predicted to cause the least amount of acceleration in a passenger cabin of the autonomous vehicle.

According to one embodiment, control module 305 includes steering control module 306 to control a steering wheel of the vehicle. In response to a request to change a direction of the vehicle, which may be planned by planning module 304, steering control module 306 determines a set of one or more steering rate candidates as the potential target steering rates. The steering rate candidates may be previously determined for the vehicle or the type of vehicles and stored in persistent storage device 352. For each of the steering rate candidates, steering control module 306 determines a cost of issuing a steering control command based on the steering rate candidate as a potential target steering rate using one or more of cost functions 124. Steering control module 306 then selects one of the steering rate candidates having the lowest total cost as the target steering rate for a subsequent command cycle.

A cost associated with a steering rate candidate represents a difficulty level at which the vehicle is able to turn as planned under the circumstances. A high cost indicates that the vehicle may have a higher difficulty level to achieve the goal of turning based on the steering candidate in question. Alternatively, the cost represents a comfort level at which a passenger is when the vehicle turns according to the steering rate candidate in question under the circumstances. A lower cost indicates that the passenger may feel more comfortable when the vehicle turns according to the steering rate candidate in question.

Figure 4:
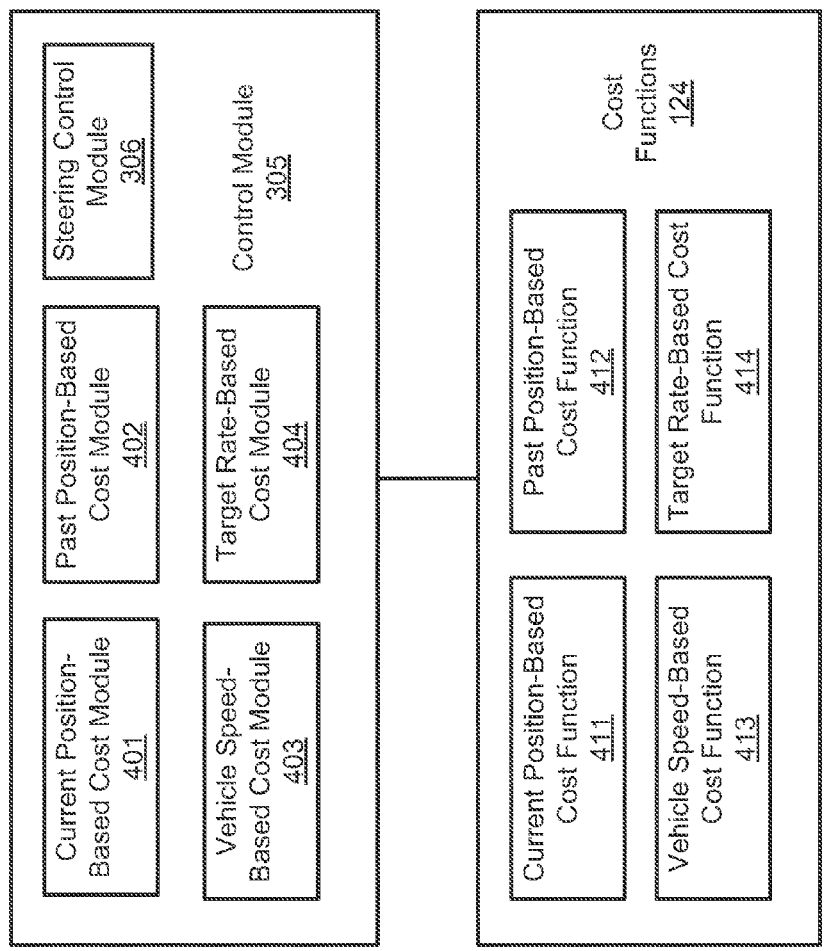
FIG. 4 is a block diagram illustrating a control module according to one embodiment of the invention.

FIG. 4 is a block diagram illustrating a control module according to one embodiment of the invention. Referring to FIG. 4, control module 305 includes a steering control module 306, current position-based cost module 401, past position-based cost module 402, vehicle speed-based cost module 403, and target rate-based cost module 404. Each of cost modules 401-404 calculates an individual cost based on a particular cost category using a corresponding one of the cost functions, such as, current position cost function 411, past position cost function 412, vehicle speed cost function 413, and target rate cost function 414. Cost functions 411-414 may be created based on prior driving statistics by a machine learning engine such as machine learning engine 122 of FIG. 1. Although there are only four cost functions representing four different cost categories, more or fewer cost functions can also be utilized.

In one embodiment, in response to a request to determine a steering rate, a set of one or more steering rate candidates is determined or selected. For each of the steering rate candidates, steering control module 306 invokes one or more of cost modules 401-404 to calculate one or more individual costs for their respective cost categories using one or more cost functions 411-414. A total cost for the steering rate is then calculated based on the individual costs generated by the cost modules 401-404 using at least some of cost functions 411-414. One of the steering rate candidates having the lowest total cost is selected as a target steering rate for a subsequent command cycle.

In one embodiment, current position-based cost function 411 is used to calculate a cost based on a current steering position and a target steering position in view of the steering rate candidate in question representing a potential target steering rate. In one embodiment, cost function 411 is used to calculate a cost based on a difference between the current steering position and the target steering position in view of the target steering rate in question. In one embodiment, if the target steering rate is greater than or equals to the difference between the current steering position and the target steering position, the cost is assigned as zero. Otherwise, if the target steering rate is less than the difference between the current steering position and the target steering position, the cost is assigned with the difference between the current steering position and the target steering position minus the target steering rate (e.g. steering rate candidate in question) as follows:

$$\text{Cost} = \text{Diff}(\text{target position}, \text{current position}) - \text{Target Steering Rate}$$

Referring now to FIG. 5, which is a data structure illustrating costs calculated using different cost functions for a set of steering rate candidates 501, costs 502 are then calculated for the steering rate candidates 501. In this example, it is assumed the difference between the current steering position and the target steering position in a current command cycle is 300. Thus, for steering rate candidate of 100 as a potential target steering rate, based on the current position-based cost function 411 as described above, since the difference of 300 is greater than the potential target steering rate of 100, therefore the cost will be 200 (i.e., the difference of 300 subtracts the target steering rate of 100). Similarly, the cost for steering rate candidate of 200 will be 100, while the cost for candidates of 300, 400, and 500 will be zero since they are greater than or equal to the difference of 300.

According to one embodiment, past position-based cost function 412 is to calculate a cost based on the previous target steering position and the previous steering position in a previous command cycle, i.e., the difference between the "current" steering position and the target steering position of the previous command cycle. In one embodiment, a previous command cycle refers to the last command cycle immediately before the current command cycle. In a further embodiment, the cost is calculated based on a relationship between the current steering rate candidate and the maximum steering rate candidate. In one embodiment, for a given steering rate candidate, the past position-based cost 503 is calculated as follows:

Cost=Difference*(Max Candidate−Current Candidate)/Max Candidate

Difference herein refers to the difference between a target steering position and a "current" steering position in a previous command cycle. The "current" candidate refers to the candidate of which the cost is to be calculated.

Referring to FIG. 5, in this example, it is assumed the difference between the past steering target position and the past steering position is 100. For steering rate of 100, the cost will be 100*(500−100)/500=80, where the maximum steering rate candidate is 500 in this example. The cost for the remaining candidates of 200, 300, 400, and 500 can also be calculated using the above algorithm as of 60, 40, 20, and 0.

According to one embodiment, the vehicle speed-based cost 504 is calculated based on the current vehicle speed in view of the current steering rate candidate. In a particular embodiment, the cost can be calculated as follows:

Cost=current vehicle speed*current steering rate candidate/100

Referring back to FIG. 5, it is assumed that the current vehicle speed is 30 mile per hour (mph). Thus, the cost for candidate of 100 will be 30*100/100=30. Similarly, the costs for candidates of 200, 300, 400, and 500 are 60, 90, 120, and 150 respectively.

According to one embodiment, the target rate-based cost 505 can be calculated using a linear cost function. The rationale behind it is that the cost is proportional to the target steering rate or steering speed: as higher steering rate costs more. For simplicity, in one embodiment, the cost for a given steering rate candidate, the target rate-based cost 505 equals to the steering rate candidate itself as shown in FIG. 5.

After all individual costs 502-505 have been calculated for each of the steering rate candidates 501, total cost 506 for each of the steering rate candidates 501 is calculated, for example, by summing individual costs 502-505. One of the steering rate candidates 501 having the lowest total cost (in this example, candidate of 100) is then selected as the target steering rate for a subsequent command cycle for steering control.

Figure 6:
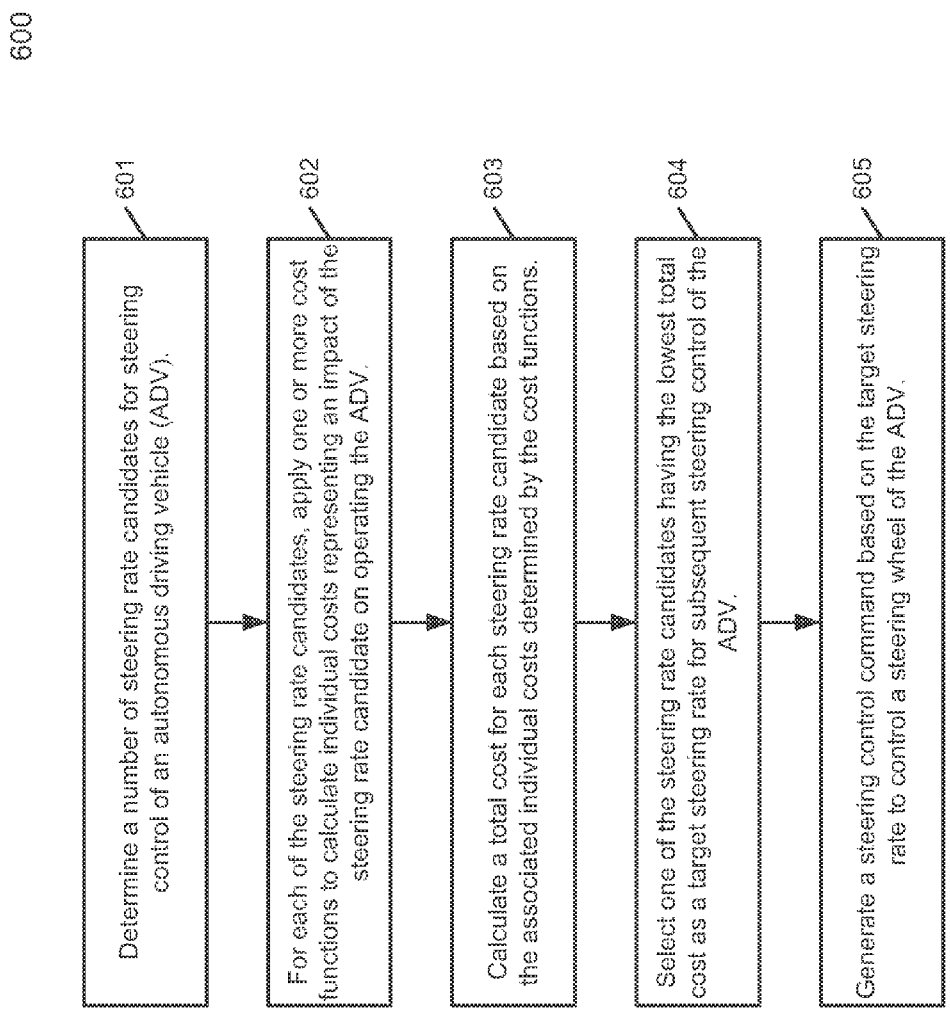
FIG. 6 is a flow diagram illustrating a process of a determining steering rate for operating an autonomous vehicle according to one embodiment of the invention.

FIG. 6 is a flow diagram illustrating a process of a determining steering rate for operating an autonomous vehicle according to one embodiment of the invention. Process 600 may be performed by processing logic which may include software, hardware, or a combination thereof. For example, process 600 may be performed by control module 305. Referring to FIG. 6, in operation 601, processing logic determines a number of steering rate candidates for steering control of an ADV. For each of the steering rate candidates, in operation 602, processing logic applies one or more cost functions to calculate one or more individual costs representing an impact of the steering rate candidate to operating the ADV. Each cost functions corresponds to one of the cost categories. In operation 603, a total cost is determined based on the individual costs for each of the steering rate candidates. In operation 604, one of the steering rate candidates having the lowest total cost is selected as a target steering rate for a subsequent command cycle for steering control of the ADV. In operation 605, a steering control command is generated based on the target steering rate to control a steering wheel of the ADV.

Figure 7:
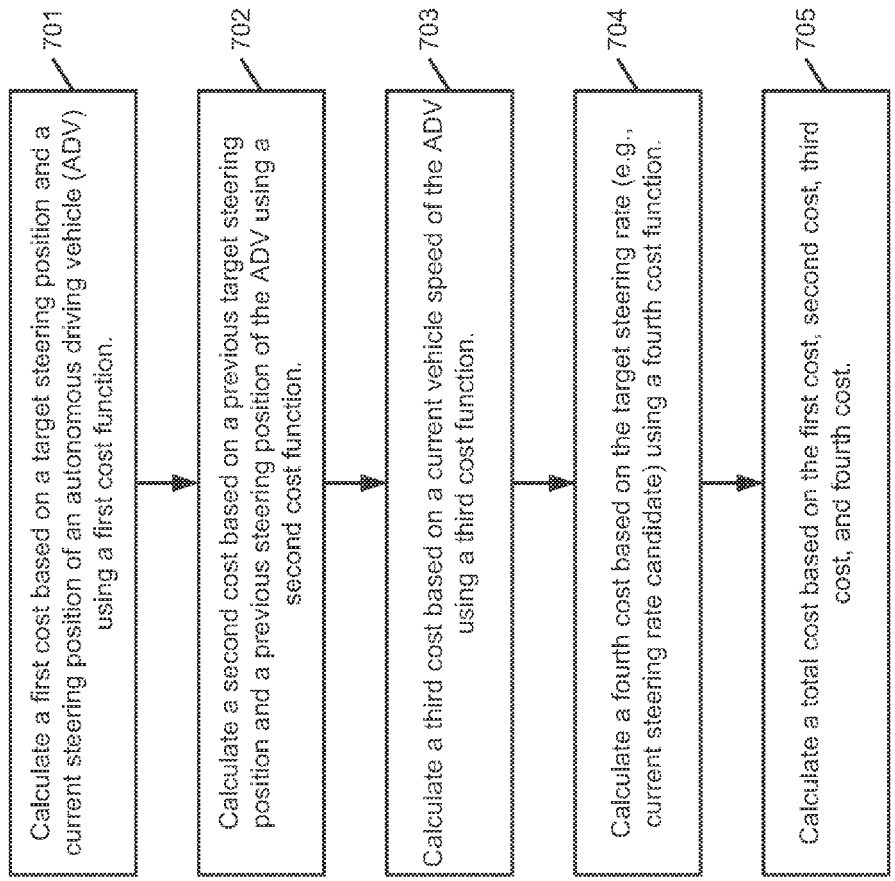
FIG. 7 is a flow diagram illustrating a process of a determining steering rate for operating an autonomous vehicle according to another embodiment of the invention.

FIG. 7 is a flow diagram illustrating a process of a determining steering rate for operating an autonomous vehicle according to another embodiment of the invention. Process 700 may be performed by processing logic which may include software, hardware, or a combination thereof. For example, process 700 may be performed by control module 305 as part of operations 602-603 of FIG. 6. Referring to FIG. 7, in operation 701, processing logic calculates a first cost based on a target steering position and a current steering position (of the current command cycle) using a first cost function. If the difference between the target and current steering positions is less than the target steering rate (e.g., current steering rate candidate in question), the first cost is zero; otherwise, the first cost equals to the difference between the target and current steering positions. In operation 702, processing logic calculates a second cost based on a past target steering position and a past steering position of a previous command cycle using a second cost function. In operation 703, processing logic calculates a third cost based on a current vehicle speed of the ADV using a third cost function. In operation 704, processing logic calculates a fourth cost based on the target steering rate (e.g., steering rate candidate in question) using a fourth cost function. In operation 705, a total cost is calculated based on the first cost, the second cost, the third cost, and the fourth cost.

Note that some or all of the components as shown and described above may be implemented in software, hardware, or a combination thereof. For example, such components can be implemented as software installed and stored in a persistent storage device, which can be loaded and executed in a memory by a processor (not shown) to carry out the processes or operations described throughout this application. Alternatively, such components can be implemented as executable code programmed or embedded into dedicated hardware such as an integrated circuit (e.g., an application specific IC or ASIC), a digital signal processor (DSP), or a field programmable gate array (FPGA), which can be accessed via a corresponding driver and/or operating system from an application. Furthermore, such components can be implemented as specific hardware logic in a processor or processor core as part of an instruction set accessible by a software component via one or more specific instructions.

Figure 8:
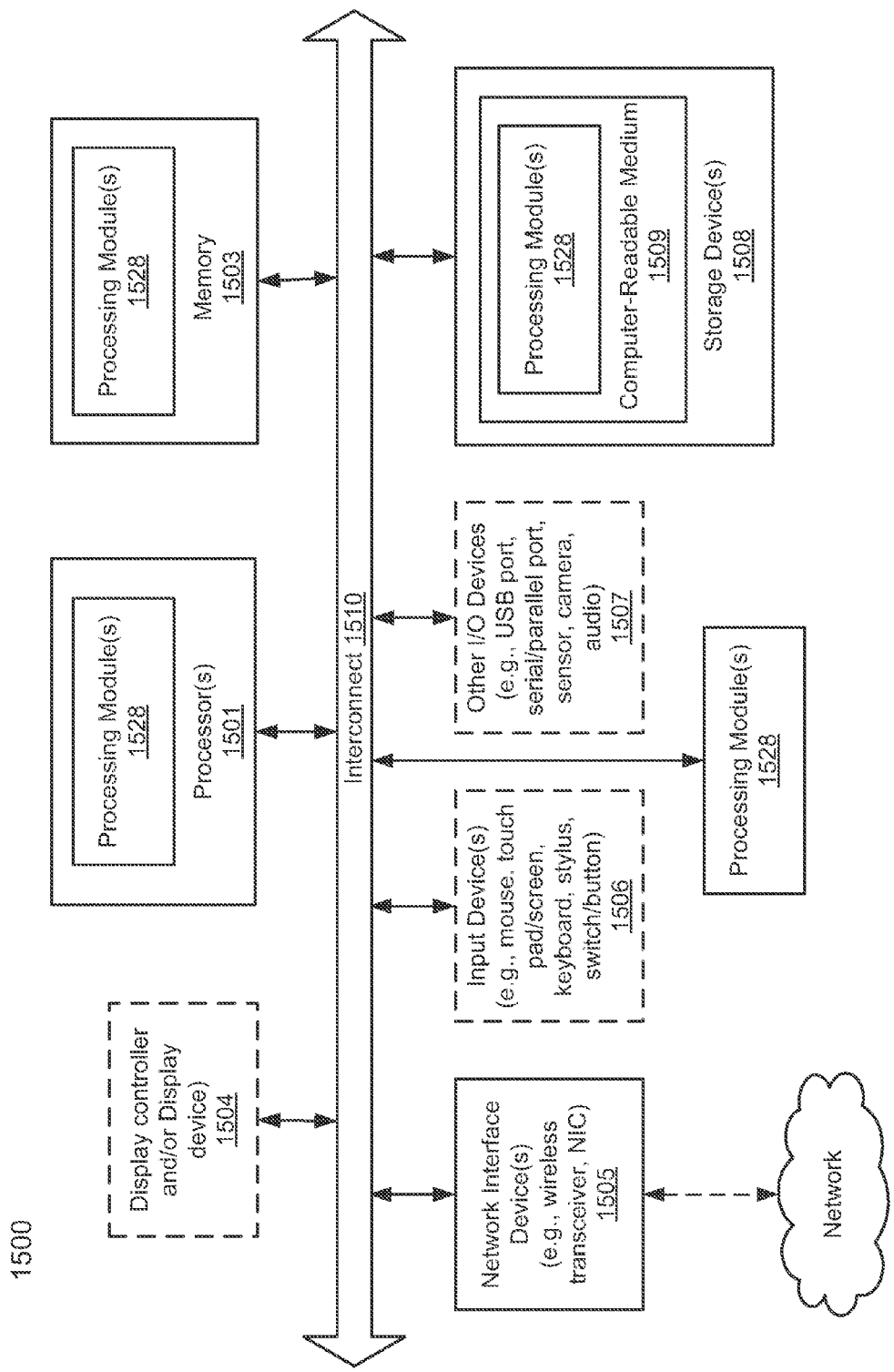
FIG. 8 is a block diagram illustrating a data processing system according to one embodiment.

FIG. 8 is a block diagram illustrating an example of a data processing system which may be used with one embodiment of the invention. For example, system 1500 may represent any of data processing systems described above performing any of the processes or methods described above, such as, for example, data processing system 110 or any of servers 103-104 of FIG. 1. System 1500 can include many different components. These components can be implemented as integrated circuits (ICs), portions thereof, discrete electronic devices, or other modules adapted to a circuit board such as a motherboard or add-in card of the computer system, or as components otherwise incorporated within a chassis of the computer system.

Note also that system 1500 is intended to show a high level view of many components of the computer system. However, it is to be understood that additional components may be present in certain implementations and furthermore, different arrangement of the components shown may occur in other implementations. System 1500 may represent a desktop, a laptop, a tablet, a server, a mobile phone, a media player, a personal digital assistant (PDA), a Smartwatch, a personal communicator, a gaming device, a network router or hub, a wireless access point (AP) or repeater, a set-top box, or a combination thereof. Further, while only a single machine or system is illustrated, the term "machine" or "system" shall also be taken to include any collection of machines or systems that individually or jointly execute a set (or multiple sets) of instructions to perform any one or more of the methodologies discussed herein.

In one embodiment, system 1500 includes processor 1501, memory 1503, and devices 1505-1508 via a bus or an interconnect 1510. Processor 1501 may represent a single processor or multiple processors with a single processor core or multiple processor cores included therein. Processor 1501 may represent one or more general-purpose processors such as a microprocessor, a central processing unit (CPU), or the like. More particularly, processor 1501 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 1501 may also be one or more special-purpose processors such as an application specific integrated circuit (ASIC), a cellular or baseband processor, a field programmable gate array (FPGA), a digital signal processor (DSP), a network processor, a graphics processor, a network processor, a communications processor, a cryptographic processor, a co-processor, an embedded processor, or any other type of logic capable of processing instructions.

Processor 1501, which may be a low power multi-core processor socket such as an ultra-low voltage processor, may act as a main processing unit and central hub for communication with the various components of the system. Such processor can be implemented as a system on chip (SoC). Processor 1501 is configured to execute instructions for performing the operations and steps discussed herein. System 1500 may further include a graphics interface that communicates with optional graphics subsystem 1504, which may include a display controller, a graphics processor, and/or a display device.

Processor 1501 may communicate with memory 1503, which in one embodiment can be implemented via multiple memory devices to provide for a given amount of system memory. Memory 1503 may include one or more volatile storage (or memory) devices such as random access memory (RAM), dynamic RAM (DRAM), synchronous DRAM (SDRAM), static RAM (SRAM), or other types of storage devices. Memory 1503 may store information including sequences of instructions that are executed by processor 1501, or any other device. For example, executable code and/or data of a variety of operating systems, device drivers, firmware (e.g., input output basic system or BIOS), and/or applications can be loaded in memory 1503 and executed by processor 1501. An operating system can be any kind of operating systems, such as, for example, Robot Operating System (ROS), Windows® operating system from Microsoft®, Mac OS®/iOS from Apple, Android® from Google®, LINUX, UNIX, or other real-time or embedded operating systems.

System 1500 may further include IO devices such as devices 1505-1508, including network interface device(s) 1505, optional input device(s) 1506, and other optional IO device(s) 1507. Network interface device 1505 may include a wireless transceiver and/or a network interface card (NIC). The wireless transceiver may be a WiFi transceiver, an infrared transceiver, a Bluetooth transceiver, a WiMax transceiver, a wireless cellular telephony transceiver, a satellite transceiver (e.g., a global positioning system (GPS) transceiver), or other radio frequency (RF) transceivers, or a combination thereof. The NIC may be an Ethernet card.

Input device(s) 1506 may include a mouse, a touch pad, a touch sensitive screen (which may be integrated with display device 1504), a pointer device such as a stylus, and/or a keyboard (e.g., physical keyboard or a virtual keyboard displayed as part of a touch sensitive screen). For example, input device 1506 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

IO devices 1507 may include an audio device. An audio device may include a speaker and/or a microphone to facilitate voice-enabled functions, such as voice recognition, voice replication, digital recording, and/or telephony functions. Other IO devices 1507 may further include universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. Devices 1507 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 1510 via a sensor hub (not shown), while other devices such as a keyboard or thermal sensor may be controlled by an embedded controller (not shown), dependent upon the specific configuration or design of system 1500.

To provide for persistent storage of information such as data, applications, one or more operating systems and so forth, a mass storage (not shown) may also couple to processor 1501. In various embodiments, to enable a thinner and lighter system design as well as to improve system responsiveness, this mass storage may be implemented via a solid state device (SSD). However in other embodiments, the mass storage may primarily be implemented using a hard disk drive (HDD) with a smaller amount of SSD storage to act as a SSD cache to enable non-volatile storage of context state and other such information during power down events so that a fast power up can occur on re-initiation of system activities. Also a flash device may be coupled to processor 1501, e.g., via a serial peripheral interface (SPI). This flash device may provide for non-volatile storage of system software, including BIOS as well as other firmware of the system.

Storage device 1508 may include computer-accessible storage medium 1509 (also known as a machine-readable storage medium or a computer-readable medium) on which is stored one or more sets of instructions or software (e.g., module, unit, and/or logic 1528) embodying any one or more of the methodologies or functions described herein. Processing module/unit/logic 1528 may represent any of the components described above, such as, for example, control module 305. Processing module/unit/logic 1528 may also reside, completely or at least partially, within memory 1503 and/or within processor 1501 during execution thereof by data processing system 1500, memory 1503 and processor 1501 also constituting machine-accessible storage media. Processing module/unit/logic 1528 may further be transmitted or received over a network via network interface device 1505.

Computer-readable storage medium 1509 may also be used to store the some software functionalities described above persistently. While computer-readable storage medium 1509 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of the present invention. The term "computer-readable storage medium" shall accordingly be taken to include, but not be limited to, solid-state memories, and optical and magnetic media, or any other non-transitory machine-readable medium.

Processing module/unit/logic 1528, components and other features described herein can be implemented as discrete hardware components or integrated in the functionality of hardware components such as ASICS, FPGAs, DSPs or similar devices. In addition, processing module/unit/logic 1528 can be implemented as firmware or functional circuitry within hardware devices. Further, processing module/unit/logic 1528 can be implemented in any combination hardware devices and software components.

Note that while system 1500 is illustrated with various components of a data processing system, it is not intended to represent any particular architecture or manner of interconnecting the components; as such details are not germane to embodiments of the present invention. It will also be appreciated that network computers, handheld computers, mobile phones, servers, and/or other data processing systems which have fewer components or perhaps more components may also be used with embodiments of the invention.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the invention also relate to an apparatus for performing the operations herein. Such a computer program is stored in a non-transitory computer readable medium. A machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments of the present invention are not described with reference to any particular programming language. It will be appreciated that a variety of programming languages may be used to implement the teachings of embodiments of the invention as described herein.

In the foregoing specification, embodiments of the invention have been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A computer-implemented method for determining a steering rate for operating an autonomous vehicle, the method comprising:
   determining a plurality of steering rate candidates for a steering control command of operating an autonomous vehicle;
   for each of the steering rate candidates,
      calculating a plurality of individual costs for the steering rate candidate by applying a plurality of cost functions, each cost function corresponding to one of a plurality of cost categories, and
      calculating a total cost for the steering rate candidate based on the individual costs produced by the cost functions;

selecting one of the steering rate candidates having a lowest total cost as a target steering rate; and generating a steering control command based on the selected steering rate candidate to control a steering wheel of the autonomous vehicle.

2. The method of claim 1, wherein calculating an individual cost for the steering rate candidate comprises calculating a first individual cost based on a difference between a target steering position and a current steering position of the autonomous vehicle using a first cost function.

3. The method of claim 2, further comprising:

assigning the first individual cost as the difference between the target steering position and the current steering position if the steering rate candidate is greater than the difference; and assigning the first individual cost as zero if the difference is greater than or equal to the steering rate candidate.

4. The method of claim 1, wherein calculating an individual cost for the steering rate candidate comprises calculating a second individual cost based on a difference between a previous target steering position and a previous steering position of the autonomous vehicle for a previous command cycle using a second cost function.

5. The method of claim 4, wherein the second individual cost is calculated based on a difference between the steering rate candidate and a highest steering rate candidate in view of the difference between the previous target steering position and the steering position.

6. The method of claim 1, wherein calculating an individual cost for the steering rate candidate comprises calculating a third individual cost based on a current vehicle speed of the autonomous vehicle in view of the steering rate candidate as a target steering rate using a third cost function.

7. The method of claim 6, wherein the third individual cost is calculated by multiplying the vehicle speed and the steering rate candidate divided by a constant.

8. The method of claim 1, wherein calculating an individual cost for the steering rate candidate comprises calculating a fourth individual cost based on the steering rate candidate as a target steering rate using a fourth cost function.

9. A non-transitory machine-readable medium having instructions stored therein, which when executed by a processor, cause the processor to perform operations, the operations comprising:

determining a plurality of steering rate candidates for a steering control command of operating an autonomous vehicle;

for each of the steering rate candidates, calculating a plurality of individual costs for the steering rate candidate by applying a plurality of cost functions, each cost function corresponding to one of a plurality of cost categories, and calculating a total cost for the steering rate candidate based on the individual costs produced by the cost functions;

selecting one of the steering rate candidates having a lowest total cost as a target steering rate; and generating a steering control command based on the selected steering rate candidate to control a steering wheel of the autonomous vehicle.

10. The machine-readable medium of claim 9, wherein calculating an individual cost for the steering rate candidate comprises calculating a first individual cost based on a difference between a target steering position and a current steering position of the autonomous vehicle using a first cost function.

11. The machine-readable medium of claim 10, wherein the operations further comprise:

assigning the first individual cost as the difference between the target steering position and the current steering position if the steering rate candidate is greater than the difference; and assigning the first individual cost as zero if the difference is greater than or equal to the steering rate candidate.

12. The machine-readable medium of claim 9, wherein calculating an individual cost for the steering rate candidate comprises calculating a second individual cost based on a difference between a previous target steering position and a previous steering position of the autonomous vehicle for a previous command cycle using a second cost function.

13. The machine-readable medium of claim 12, wherein the second individual cost is calculated based on a difference between the steering rate candidate and a highest steering rate candidate in view of the difference between the previous target steering position and the steering position.

14. The machine-readable medium of claim 9, wherein calculating an individual cost for the steering rate candidate comprises calculating a third individual cost based on a current vehicle speed of the autonomous vehicle in view of the steering rate candidate as a target steering rate using a third cost function.

15. The machine-readable medium of claim 14, wherein the third individual cost is calculated by multiplying the vehicle speed and the steering rate candidate divided by a constant.

16. The machine-readable medium of claim 9, wherein calculating an individual cost for the steering rate candidate comprises calculating a fourth individual cost based on the steering rate candidate as a target steering rate using a fourth cost function.

17. A data processing system, comprising:

a processor; and a memory coupled to the processor to store instructions, which when executed by the processor, cause the processor to perform operations, the operations including determining a plurality of steering rate candidates for a steering control command of operating an autonomous vehicle;

for each of the steering rate candidates, calculating a plurality of individual costs for the steering rate candidate by applying a plurality of cost functions, each cost function corresponding to one of a plurality of cost categories, and calculating a total cost for the steering rate candidate based on the individual costs produced by the cost functions;

selecting one of the steering rate candidates having a lowest total cost as a target steering rate; and generating a steering control command based on the selected steering rate candidate to control a steering wheel of the autonomous vehicle.

18. The system of claim 17, wherein calculating an individual cost for the steering rate candidate comprises calculating a first individual cost based on a difference between a target steering position and a current steering position of the autonomous vehicle using a first cost function.

19. The system of claim 18, wherein the operations further comprise:

assigning the first individual cost as the difference between the target steering position and the current steering position if the steering rate candidate is greater than the difference; and assigning the first individual cost as zero if the difference is greater than or equal to the steering rate candidate.

20. The system of claim 17, wherein calculating an individual cost for the steering rate candidate comprises calculating a second individual cost based on a difference between a previous target steering position and a previous steering position of the autonomous vehicle for a previous command cycle using a second cost function.

21. The system of claim 20, wherein the second individual cost is calculated based on a difference between the steering rate candidate and a highest steering rate candidate in view of the difference between the previous target steering position and the steering position.

22. The system of claim 17, wherein calculating an individual cost for the steering rate candidate comprises calculating a third individual cost based on a current vehicle speed of the autonomous vehicle in view of the steering rate candidate as a target steering rate using a third cost function.

23. The system of claim 22, wherein the third individual cost is calculated by multiplying the vehicle speed and the steering rate candidate divided by a constant.

24. The system of claim 17, wherein calculating an individual cost for the steering rate candidate comprises calculating a fourth individual cost based on the steering rate candidate as a target steering rate using a fourth cost function.

* * * * *